US006455623B1

(12) United States Patent
Howard

(10) Patent No.: US 6,455,623 B1
(45) Date of Patent: Sep. 24, 2002

(54) FREEZE-RESISTANT FLUID COMPOSITIONS

(75) Inventor: David L. Howard, Longmont, CO (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/584,227

(22) Filed: May 31, 2000

(51) Int. Cl.$^7$ .................................................. C08K 5/01
(52) U.S. Cl. ........................... 524/474; 2/24; 36/35 R; 36/37; 36/71; 524/481; 524/485
(58) Field of Search .................................. 2/24, 267, 20; 36/35 R, 37, 71; 524/2, 474, 481, 484, 485, 486, 505, 386

(56) References Cited

U.S. PATENT DOCUMENTS

| | | | |
|---|---|---|---|
| 4,144,658 A | 3/1979 | Swan, Jr. ...................... 36/117 |
| 4,369,284 A | 1/1983 | Chen ......................... 524/476 |
| 4,377,655 A | 3/1983 | Himes ........................ 524/313 |
| 4,589,223 A | 5/1986 | Hastings .................... 43/42.24 |
| 4,728,551 A | 3/1988 | Jay ............................. 428/76 |
| 5,626,657 A | 5/1997 | Pearce ........................ 106/122 |
| 5,869,164 A | 2/1999 | Nickerson et al. ............ 428/76 |
| 5,994,450 A | 11/1999 | Pearce ........................ 524/405 |
| 6,020,055 A | 2/2000 | Pearce ........................ 428/323 |
| 6,197,099 B1 * | 3/2001 | Pearce ........................ 106/122 |

* cited by examiner

*Primary Examiner*—Paul R. Michl
(74) *Attorney, Agent, or Firm*—MacMillan, Sobanski & Todd, LLC

(57) ABSTRACT

A freeze-resistant fluid composition has the capacity to deform in response to continuously applied pressure and has the ability to maintain its shape and position in the absence of continuously applied pressure. The composition contains a freeze point depressant effective to make the composition resistant to freezing as measured by a penetrometer measurement of at least 13 millimeters at 25° F. (−4° C.). In another embodiment, the composition comprises a fluid mixture of a relatively saturated oil, a relatively unsaturated oil, a block copolymer, and a freeze point depressant. In another embodiment, the composition comprises a fluid mixture of 20%–70% of a relatively saturated oil, 20%–70% of a relatively unsaturated oil, and 0.3%/–10% of a block copolymer.

7 Claims, No Drawings

FREEZE-RESISTANT FLUID COMPOSITIONS

BACKGROUND OF THE INVENTION

This invention relates in general to freeze-resistant fluid compositions, and in particular to freeze-resistant fluid compositions suitable for use in deformable, pressure-compensating padding devices.

A wide variety of deformable, pressure-compensating fluid compositions have been developed for use in seats, cushions, boot liners, mattresses, fitting pads, athletic equipment, prosthetic devices and other padding devices which are placed in prolonged contact with the human body. The compositions have the capacity to deform in response to continuously applied pressure and thereby adapt to the contour of a particular part of the human body. Some of the compositions maintain their shape and position in the absence of continuously applied pressure.

One such fluid composition is described in U.S. Pat. No. 5,869,164 to Nickerson et al. The composition is a viscous, grease-like thixotropic fluid comprising an oil thickened with a diblock polymer. The diblock polymer includes a first block that is compatible with the oil and a second block that is incompatible with the oil. The patent states that the composition does not stiffen to unacceptably high viscosities when chilled to a temperature of 40° F. (4° C.). However, it has now been found that the composition stiffens considerably when exposed to lower temperatures, e.g., 25° F. (−4° C.) or below. This can cause problems because padding devices are sometimes exposed to low ambient temperatures. A fluid that is stiff and incapable of deforming in response to pressure is unacceptable for use in a padding device. Other deformable, pressure-compensating fluid compositions also suffer from this drawback. Accordingly, there is a need for a deformable, pressure-compensating fluid composition suitable for use in padding devices that is resistant to freezing at low temperatures.

SUMMARY OF THE INVENTION

The present invention provides a freeze-resistant fluid composition. In a first embodiment, the composition comprises a fluid composition having the capacity to deform in response to continuously applied pressure and having the ability to maintain its shape and position in the absence of continuously applied pressure. The composition contains a freeze point depressant effective to make the composition resistant to freezing as measured by a penetrometer measurement of at least 13 millimeters at 25° F. (−4° C.). In a second embodiment, the composition comprises a fluid mixture of a relatively saturated oil, a relatively unsaturated oil, a block copolymer, and a freeze point depressant. In a third embodiment, the composition comprises a fluid mixture of a relatively saturated oil in an amount within the range of from about 20% to about 70% by weight, a relatively unsaturated oil in an amount within the range of from about 20% to about 70% by weight, and a block copolymer in an amount within the range of from about 0.3% to about 10% by weight. Preferably, the oils are vegetable oils. The invention also provides a pressure compensating padding device comprising a flexible envelope and the freeze-resistant fluid composition within the envelope.

Various advantages of this invention will become apparent to those skilled in the art from the following detailed description of the preferred embodiments.

DETAILED DESCRIPTION OF THE PREFERRED EMBODIMENTS

The freeze-resistant fluid composition can be any composition which is resistant to freezing and which is suitable for use in its intended application. Typically, the fluid composition is used in a deformable, pressure-compensating padding device. The fluid composition usually has a viscosity within a range of from about 100,000 to about 1,000,000 centipoise, and typically from about 100,000 to about 280,000 centipoise. When used in a padding device, the fluid composition should have the capacity to deform in response to continuously applied pressure and the ability to maintain its shape and position in the absence of continuously applied pressure.

One such fluid composition is disclosed in U.S. Pat. No. 5,549,743 to Pearce, issued Aug. 27, 1996 (incorporated by reference herein). The fluid composition is a mixture of spherical objects and lubricant suitable for providing cushioning properties. Typically, the spherical objects are microspheres having a diameter less than 2000 microns. Any of a variety of lubricants facilitating sliding and rolling between the microspheres can be used.

The above-described U.S. Pat. No. 5,869,164 to Nickerson et al., issued Feb. 9, 1999 (incorporated by reference herein), discloses a viscous thixotropic fluid suitable for use in a deformable, pressure-compensating padding device. The fluid composition comprises an oil thickened with a block copolymer. Various oils and block polymers suitable for use in the fluid composition are described in more detail below.

The Oil

The oil suitable for use in the fluid composition can be any type of oil suitable for forming a composition having the intended properties. Certain types of oils are particularly suited for combining with block copolymers to make viscous, thixotropic fluid compositions. Such oils include, for example, vegetable oils, polyalphaolefin oils, polybutene oils, dialkyl carbonate oils, and paraffinic mineral oils.

Some examples of suitable vegetable oils include canola, cottonseed, corn, olive, soy, peanut, coconut, linseed, safflower, sunflower, and other triglyceride oils. Mixtures of different vegetable oils can also be used. To reduce the potential for oxidation of the vegetable oil over time, preferably an oxidation-resistant vegetable oil is used in the composition, and/or the vegetable oil is processed to resist oxidation. Canola oil is an example of a vegetable oil that is less susceptible to oxidation than most other vegetable oils. The vegetable oil can be hydrogenated and/or fractionated to provide a lower degree of unsaturation for greater resistance to oxidation. A preferred vegetable oil for use in the composition of the invention is a partially hydrogenated, fractionated canola oil, such as Solo 1000 produced by C&T in Charlotte, N.C. Genetically engineered versions of regular and hydrogenated canola oil, which are particularly robust, are sold by Cargill Foods as Clear Valley 65, Clear Valley 75 and Odyssey 500.

Fluid compositions formed with vegetable oils according to the invention are usually more biodegradable than conventional materials used in padding devices. The compositions can be broken down by microorganisms so that they cause fewer problems in the environment. Preferably, the compositions are substantially completely broken down in less than 100 years under optimal biodegradation conditions (e.g., suitable moisture, heat, oxygen, and presence of microorganisms). Biodegradable compositions are in great demand in the marketplace.

Polyalphaolefin (PAO) oils are synthetic, saturated aliphatic oils, which are polymerized from a variety of feedstocks. The "Durasyn" brand of PAO oils are produced from a 1-decene (10 carbon chain) feedstock from Amoco Corporation. The Durasyn PAO oils are available in a wide variety of molecular weights depending on the number of 1-decene units that are incorporated into the final molecule. A preferred PAO oil is Durasyn 168, which is a hydrogenated homopolymer of 1-decene with a molecular weight of about 1120.

Polybutene oils suitable for use in the fluid composition include the "Indopol" brand of polybutene oils sold by Amoco. These low molecular weight polybutene oils create a very thick, very viscous, highly thixotropic composition. Suitable dialkyl carbonate oils include the "Mix Oil" dialkyl carbonate oils sold by Agip Petroli. Suitable paraffinic mineral oils include the Shell "Carnea" paraffinic mineral oils.

In some preferred embodiments, the freeze-resistant fluid composition includes a blend of a relatively saturated oil and a relatively unsaturated oil. In these embodiments, the relatively unsaturated oil is important for providing a fluid composition that does not easily freeze; a composition containing a relatively saturated oil alone easily freezes even when a freeze point depressant is added to the composition. Conversely, in these embodiments, a composition containing a blend of a relatively saturated oil and a relatively unsaturated oil will not easily freeze even without a freeze point depressant. A composition containing a relatively unsaturated oil alone will not easily freeze, but the composition may experience problems with oxidation over time that can lead to rancidity. The fluid composition of the invention is preferably resistant to oxidation, having a life cycle of at least 50 years at room temperature (21° C.). The oxidation resistance can be measured by a peroxide measurement of less than 100 mili equivalents per Kg.

Preferably, the fluid composition includes a relatively saturated oil in an amount within the range of from about 20% to about 80% by weight, more preferably from about 40% to about 60%, and a relatively unsaturated oil in an amount within the range of from about 20% to about 80% by weight, more preferably from about 40% to about 60%. The saturated oil component can be one or more saturated oils, and the unsaturated oil component can be one or more unsaturated oils.

The relatively saturated oil usually has an iodine value of not greater than about 94, typically within a range of from about 62 to about 94, and more typically from about 78 to about 84. The relatively unsaturated oil usually has an iodine value of not less than about 100, typically within a range of from about 100 to about 144, and more typically from about 110 to about 120. The iodine value of the oils can be measured by any standard method known in the oil and fat industry.

The relatively saturated oil and the relatively unsaturated oil can be any type of oil suitable for providing a freeze-resistant fluid composition. Preferably, the relatively saturated oil and the relatively unsaturated oil are both vegetable oils. In a preferred embodiment, the relatively saturated oil is hydrogenated/fractionated canola oil and the relatively unsaturated oil is regular canola oil. "Regular" means oil which has not been subjected to a process to increase its saturation.

The relatively saturated oil and the relatively unsaturated oil can be provided by any suitable means. Preferably, the relatively saturated oil has been subjected to hydrogenation and/or fractionation to increase its saturation.

If needed, antioxidants can be added to the vegetable oil to further improve the life of the oil. Some examples of suitable antioxidants include BHT, BHA, TBHQ, Irgonox, and hindered phenols commonly used in the manufacture of plastics.

A silicone oil can be added to a vegetable oil based composition to improve the oxidation resistance and other properties of the composition. An example of a suitable silicone oil is Dow Corning, 200–500 cst silicone oil.

The Block Copolymer

The block copolymer suitable for use in the fluid composition can be any type of block copolymer suitable for forming a composition having the intended purposes. The block copolymer can be any type of block copolymer, such as a diblock polymer or a triblock polymer. The block copolymer can also be a blend of different block polymers.

Certain types of diblock polymers are particularly suited for combining with oils to make viscous, thixotropic fluid compositions. These diblock polymers have one type of block which has a poor affinity for and is insoluble in the selected oil, and another type of block which has an affinity for and is soluble in the oil. This is described in more detail in the Nickerson patent at column 3, line 66 to column 4, line 11 and column 4, line 50 to column 5, line 17. Some examples of such diblock polymers include polystyrene-polybutadiene ("SB"), polystyrene-polyisoprene ("SI"), polystyrene-poly(ethylene-propylene) ("SEP") and polyethylene-polypropylene ("EP"). For example, when polystyrene-polybutadiene is used in the composition, the rigid polystyrene block of the diblock polymer has a poor affinity for and are insoluble in the selected oil, while the soft (rubber-like) elastomeric polybutadiene block has an affinity for and is soluble in the oil.

As described in the Nickerson et al. patent, it is postulated that the difference in solubility of the two blocks and the oil results in micelles being formed, with the rigid polystyrene blocks clustering together into groups and the elastomeric polybutadiene blocks being drawn outward and essentially dissolving into the surrounding oil. The micellular structure of the composition provides desirable thixotropic properties. The interaction/intertangling of the many elastomeric blocks extending out from the polystyrene clusters of the micelles into the oil causes a thickening effect which turns the oil into a deformable, thixotropic fluid. The strong affinity of the oil for the elastomeric blocks makes the composition highly resistant to separation, e.g., bleeding out of the oil from the composition.

Diblock polymers having one polystyrene block and one polybutadiene block are particularly useful with vegetable oils. Such polymers are available from EniChem America Inc. under the tradename EniChem Sol 1205, from Dexco under the tradename Vector 6000, 6001 and 6030, and from Firestone under the tradename Stereon 730A. Other suitable SB elastomers are sold by Shell under the tradename G-1654X, G-1765X and FG-1901X.

A preferred diblock polymer for use with the PAO oils are thermoplastics where one block of the polymer is rigid polystyrene and the other block is soft rubber-like elastomer sold commercially by Shell Chemical Co. under the name Kraton G1701 and Kraton G1702.

A thixotropic fluid composition can also be formed by the interaction of a major portion of a silicone oil mixed with a diblock polymer having a soft silicone polymer grafted onto a hard polystyrene block to form a micellular emulsion. The present invention also contemplates diblock polymers formed by grafting a rigid polycarbonate onto polyisoprene, polybutadiene, or poly(ethylene-propylene). A diblock polymer having a soft polyester block would form a micellular emulsion with an ester oil, and a diblock polymer having a soft polyglycol ester block would form a micellular emulsion with such a glycol ester.

Triblock polymers can also be used in the fluid composition, preferably triblock polymers that form micelles when mixed with a compatible oil. Triblock copolymers have the general configuration A-B-A, where each "A" is a polymer end block that is hard at room temperature but fluid upon heating, and "B" is a polymer center block that is soft or elastomeric at room temperature. Some specific examples of triblock copolymers for use in the fluid composition include polystyrene-polybutadiene-polystyrene ("SBS"), polystyrene-polyisoprene-polystyrene ("SIS"), polystyrene-poly(ethylene-butylene)-polystyrene ("SEBS"), and polystyrene-poly(ethylene-propylene)-polystyrene ("SEPS"). Some examples of commercially available triblock polymers include the Kraton series of polymers sold by Shell Chemical Co. Some additional examples of commercially available SBS elastomers include Shell D-1184, D-1116, D-1102 and D-1107 manufactured by Shell Chemical Co., and EniChem TE 6306, TE 6414 and Sol T161 B manufactured by EniChem America Inc.

The Freeze Point Depressant

Some embodiments of the fluid composition contain a freeze point depressant effective to make the composition resistant to freezing. The resistance to freezing is measured by a penetrometer measurement of at least 13 millimeters (0.5 inch) at 25° F. (−4° C.). Preferably, the fluid composition is resistant to freezing at a temperature down to 20° F. (−7° C.), as measured by a penetrometer measurement of at least 13 millimeters at that temperature. The penetrometer is a Model 73500 penetrometer from Precision Scientific Petroleum Instrument Co./Varien Instrument Inc., of Bellwood, Ill., with a 102 gram, 2⅝ inch diameter cone. The distance that the cone penetrates into the material is measured in millimeters. Of course the penetrometer measurement, like any other parameter mentioned in this application, can be measured by any other suitable test.

Examples of suitable freeze point depressants for use in the fluid compositions include derivatives of polymethyl-methacrylate (RohMax 171, sold by Rohm-Haas), and glyceryl monooleate (sold by AC Humco and Stepan). Other suitable freeze point depressants include conventional anti-freeze materials such as propylene glycol, ethylene glycol, methanol and methoxypropanol.

Optional Ingredients

A variety of optional ingredients can be included in the fluid composition of the invention. For example, the composition can include microballoons to reduce the weight of the composition. Microballoons are small, hollow, low-density particles of film-forming materials such as plastic or glass. Usually, the microballoons are discrete micro-sized particles having a diameter within the range of from about 10 microns to about 300 microns. It is generally preferred to use from about 2% to about 4% plastic microballoons or from about 5% to about 40% glass microballoons, by weight of the composition. Suitable plastic microballoons are sold by Nobel Industries under the commercial name Expancel 091 DE, Expancel 461 DE and Expancel 551 DE. Glass microballoons are less preferred, because the addition of non-melting solid particles such as glass microballoons is minimized to avoid increasing the composition's flammability.

A fluid composition made with vegetable oil according to the invention is inherently nonflammable. However, if desired, a fire retardant can be added to the fluid composition to make it even more nonflammable. For example, a fire retardant can be added so that the composition passes the Cal 133 test for nonflammability (California Technical Bulletin 133 Flame Ignition Resistance Test, January 1992, entire document), in which numerous newspapers are used as a fuel source over the material to be tested. Examples of suitable fire retardants include melamine, melamine di-borate, ammonium octamolybdate, zinc borate, hydrated borax, brominated aromatic, brominated aliphatic, magnesium hydroxide, brominated polystyrene, zinc molybdate, magnesium sulfate, bismuth subcarbonate, alumina trihydrate, antimony pentoxide, and others known in the art. Intumescent flame retardants can also be used. Plastic coated fire retardants such as Exolit Hostaflam AP462, an ammonium polyphosphate, minimize potential skin irritation or sensitivity. Hoechst Celanese makes this product. A charring agent such as Perstorp's pentaerythritol is also beneficial. The preferred compositions of the invention including a vegetable oil usually require not more than about 5% fire retardant by weight for the compositions to pass the Cal 133 test. In contrast, a petroleum-based fluid composition would usually require 30% or more fire retardant to pass the Cal 133 test.

Another optional ingredient is a thickener such as wax, clay or silica. In some embodiments, the fluid composition includes a high temperature wax to further reduce the flammability of the composition. "High temperature" means a wax having a melting point greater than 105° C. Preferably, the high temperature wax is an amide wax. An example of a preferred high temperature wax is P285 wax manufactured by CasChem, which is a hydroxy bis stearamide wax. Preferably, the amount if high temperature wax is within the range of from about 2% to about 10% by weight of the composition.

A plasticizer such as mineral oil, process oil or glycerin can be added to improve the properties of the composition or enhance processing.

Other possible optional ingredients include process aids, colorants, perfumes, extenders, fillers, tackifiers, UV stabilizers, and surfactants.

Processing

The fluid compositions of the invention can be prepared by any suitable process. Typically, the oil is placed in a mixer and the block polymer and any other ingredients are added to the oil. The materials are mixed until the desired product is achieved. When the oil is vegetable oil, it is usually desirable to heat the materials during mixing, for example, at a temperature of about 160° F. (71° C.). In one suitable process, the block copolymer is ground into a powder and added to the oil along with any other ingredients, and then the materials are homogenized in a heated colloid mill.

Padding Devices According to the Invention

A pressure compensating padding device according to the invention comprises a flexible envelope and a freeze-resistant fluid composition within the envelope. The flexible protective envelope has a cavity which contains the fluid composition. The envelope has a structure which allows the fluid composition to deform in the cavity in response to a continuously applied load on the envelope, but to maintain position in the absence of pressure. By deforming in response to continuously applied pressure, the padding device is able to adapt to the contour of a particular part of the human body.

The envelope in which the fluid composition is confined can be fabricated from any flexible sheet-like material which is inert with respect to the fluid composition and/or any component thereof. The material from which the envelope is made should also provide a complete barrier for all components of the fluid composition. The envelope can be formed of a variety of flexible and pliable materials known to the art, e.g., synthetic resinous materials, such as polyurethanes. Preferably, the material used to construct the envelope will be heat or radio frequency sealable to provide a substantially impervious seal which prevents leakage of any and all materials. The material also should be flexible and/or elastomeric, both at ambient room temperatures and at temperatures approaching body temperature.

The padding device can be used for a broad range of applications, such as wheelchairs or other seating, prosthetic and other medical devices, mattresses, helmet padding, bicycle seats, knee pads, and athletic equipment pads. In general, the padding device can be used in any situation where the human body is in prolonged, abutting contact with a mechanical device.

EXAMPLE 1

(Prior Art)

A thixotropic fluid composition such as disclosed in the Nickerson patent was prepared as follows:

| Component | Percentage |
| --- | --- |
| Hydrogenated/Fractionated Canola Oil (Solo 1000) | 85.25% |
| Diblock Polymer (Enichem Sol 1205) | 4.75 |
| Amide Wax (P285, ChasChem) | 5 |
| Silicone Oil (Dow Corning, 200–500 cst) | 4 |
| Antioxidants (BHT, BHA) | 1 |

The fluid composition was tested for stiffness at different temperatures by use of the penetrometer. A fluid composition has acceptable deformability for use in a padding device when the penetrometer measurement is at least 13 mm.

A first penetrometer measurement was taken at room temperature, 72° F. (21° C.). The fluid composition had a penetration of 27–28 mm at 72° F. (21° C.). The fluid composition was cooled to 20° F. (−7° C.), and a second penetrometer measurement was taken. The fluid composition had a penetration of only 7–8 mm at 20° F. (−7° C.). The fluid composition was held for 15 minutes at room temperature, until its temperature reached 25° F. (−4° C.), and a third penetrometer measurement was taken. The penetration of the fluid composition only improved to 9.5 mm at 25° F. (−4° C.). It was concluded that the Nickerson fluid composition stiffens unacceptably when exposed to low temperatures.

EXAMPLE 2

(Comparative)

Three fluid compositions were prepared in accordance with the invention. The compositions were the same as the Nickerson composition disclosed in Example 1, except that the oil was a 50/50 mixture of regular canola oil and partially hydrogenated/fractionated canola oil instead of 100% partially hydrogenated/fractionated canola oil. The second and third compositions also differed in the addition of a freeze point depressant. The compositions were prepared as follows:

| Component | Percentage |
| --- | --- |
| A. Addition of Regular Canola Oil: | |
| Regular Canola Oil (Solo 100) | 42.6% |
| Hydrogenated/Fractionated Canola Oil (Solo 1000) | 42.6 |
| Diblock Polymer (Enichem Sol 1205) | 4.75 |
| Amide Wax (P285, ChasChem) | 5 |
| Silicone Oil (Dow Corning, 200–500 cst) | 4 |
| Antioxidants (BHT, BHA) | 1 |
| B. Addition of Regular Canola Oil and Freeze Pt. Depressant (Humco): | |
| Regular Canola Oil (Solo 100) | 41.8% |
| Hydrogenated/Fractionated Canola Oil (Solo 1000) | 41.8 |
| Diblock Polymer (Enichem Sol 1205) | 4.75 |
| Amide Wax (P285, ChasChem) | 5 |
| Silicone Oil (Dow Corning, 200–500 cst) | 4 |
| Antioxidants (BHT, BHA) | 1 |
| Freeze Pt. Depressant (Humco 50# Carpol ET Pail) | 1.5 |
| C. Addition of Regular Canola Oil and Freeze Pt. Depressant (RohMax): | |
| Regular Canola Oil (Solo 100) | 42.4% |
| Hydrogenated/Fractionated Canola Oil (Solo 1000) | 42.4 |
| Diblock Polymer (Enichem Sol 1205) | 4.75 |
| Amide Wax (P285, ChasChem) | 5 |
| Silicone Oil (Dow Corning, 200–500 cst) | 4 |
| Antioxidants (BHT, BHA) | 1 |
| Freeze Pt. Depressant (RohMax 171) | 0.4 |

Penetrometer measurements were taken on the compositions to compare their penetration at low temperatures with the composition disclosed in the Nickerson patent. The measurements were taken: (1) with the compositions cooled to 20° F. (−7° C.), (2) after the compositions were subjected to mechanical work at 20° F. (−7° C.), and (3) after the compositions were allowed to sit at room temperature for 5 minutes after the 20° F. (−7° C.) work. The following results were obtained:

| | A. 50% | B. 50% + 1.5% Humco | C. 50% + 0.4% RohMax |
| --- | --- | --- | --- |
| At 20° F. | 12–14.4 mm | 14.4 mm | 17.7 mm |
| Mechanical work | 16.6 mm | 17.7 mm | 20.4 mm |
| 5 minutes after work | 19.8 mm | 23.2 mm | 23.7 mm |

The results show that the penetration of all the compositions was improved at 20° F. (−7° C.) compared with the composition disclosed in the Nickerson patent. As mentioned above, a penetration of at least 13 mm is considered acceptable for use in a padding device. Composition A, with the addition of regular canola oil but no freeze point depressant, had a penetration of 12–14.4 mm at 20° F. (−7° C.), which is borderline acceptable for use in a padding device. However, the penetration was significantly improved compared to the penetration of only 7–8 millimeters at 20° F. (−7° C.) of the Nickerson composition. The addition of the Humco freeze point depressant in Composition B improved the penetration to 14.4 mm at 20° F. (−7° C.), and the addition of the RohMax freeze point depressant in Composition C improved the penetration to 17.7 mm at 20° F. (−7° C.).

The penetration of all the compositions was also improved after mechanical work at 20° F. (−7° C). Composition A had a penetration of 16.6 mm, Composition B had a penetration of 17.7 mm, and Composition C had a penetration of 20.4 mm. It was concluded that modifying the Nickerson composition with a freeze point depressant accelerates fluid recovery after mechanical work.

Additionally, the penetration of all the compositions was improved after the compositions were allowed to sit at room temperature for 5 minutes after the work at 20° F. (−7° C.).

Composition A had a penetration of 19.8 mm, Composition B had a penetration of 23.2 mm, and Composition C had a penetration of 23.7 mm. In contrast, the penetration of the Nickerson composition only improved to 9.5 mm after sitting at room temperature for 15 minutes. It was concluded that modifying the Nickerson composition with a freeze point depressant causes the fluid composition to become more mobile after it sits at room temperature.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A pressure compensating padding device comprising a flexible envelope and a freeze-resistant fluid composition within the envelope, the composition comprising a fluid mixture of a relatively saturated oil having an iodine value not greater than about 94 in an amount within the range of from about 20% to about 70% by weight, a relatively unsaturated oil having an iodine value not less than about 100 in an amount within the range of from about 20% to about 70% by weight, and a block polymer in an amount within the range of from about 0.3% to about 10% by weight.

2. The padding device defined in claim 1 wherein the composition comprises the relatively saturated oil in an amount within the range of from about 30% to about 60% by weight and the relatively unsaturated oil in an amount within the range of from about 30% to about 60% by weight.

3. The padding device defined in claim 1 wherein the relatively saturated oil has been subjected to hydrogenation and/or fractionation to increase its saturation.

4. The padding device defined in claim 1 wherein the relatively saturated oil has an iodine value within a range of from about 62 to about 94, and the relatively unsaturated oil has an iodine value within a range of from about 100 to about 144.

5. The padding device defined in claim 1 wherein the relatively saturated oil and the relatively unsaturated oil are both vegetable oils.

6. The padding device defined in claim 1 wherein the composition is resistant to freezing at a temperature of 25° F., as indicated by a penetrometer measurement of at least 13 millimeters.

7. The padding device defined in claim 1 wherein the composition has a life cycle of at least 50 years at room temperature (21° C.), as indicated by a peroxide measurement of less than 100 mili equivalents per Kg.

* * * * *